Figure 1:
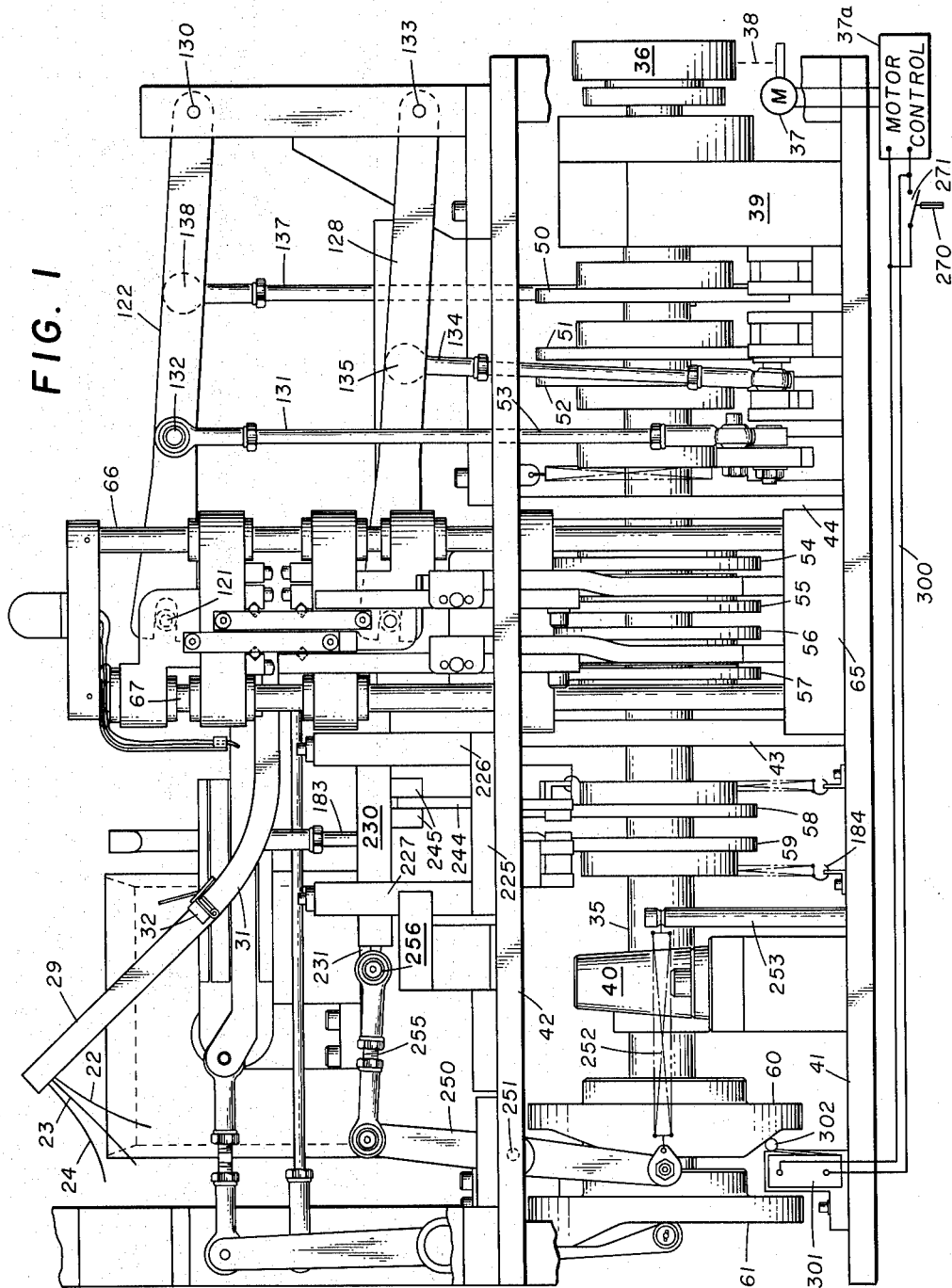

Nov. 23, 1965    O. M. STROHL    3,219,068
SYSTEM FOR HANDLING ELECTRICAL COMPONENTS
HAVING SLENDER COLUMNAR LEADS
Filed Feb. 14, 1963    6 Sheets-Sheet 3

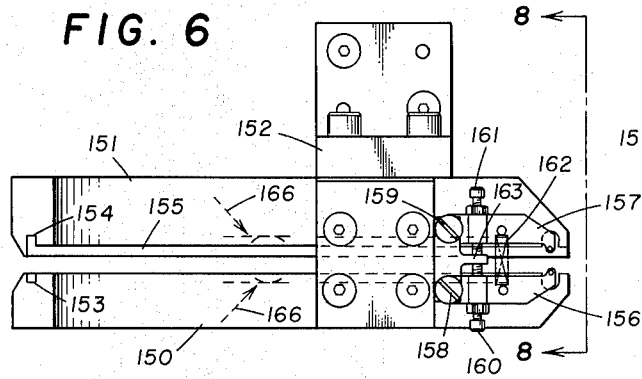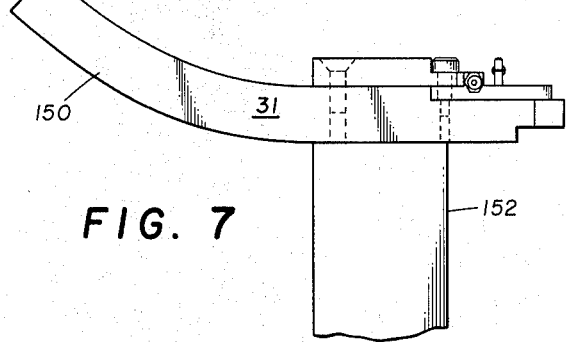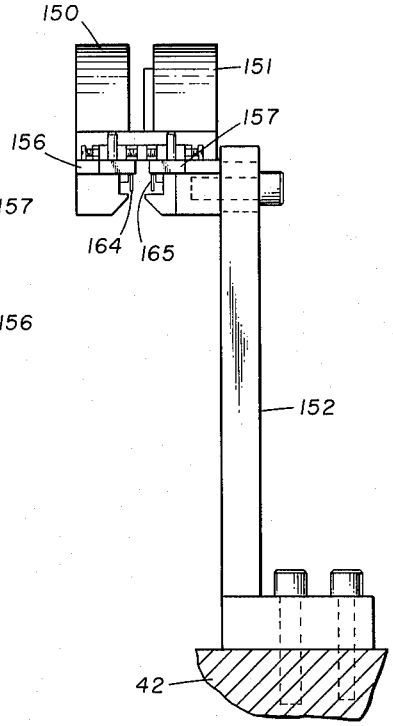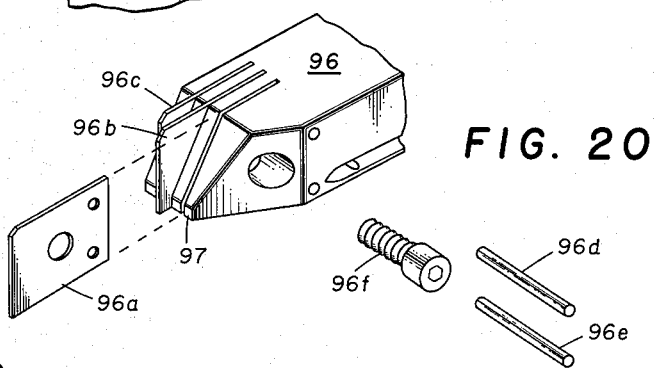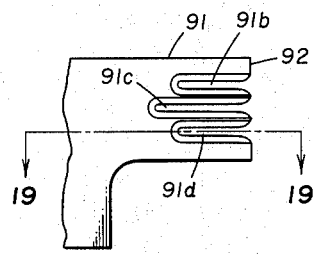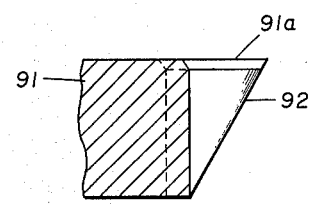

Nov. 23, 1965  O. M. STROHL  3,219,068
SYSTEM FOR HANDLING ELECTRICAL COMPONENTS
HAVING SLENDER COLUMNAR LEADS
Filed Feb. 14, 1963  6 Sheets-Sheet 5
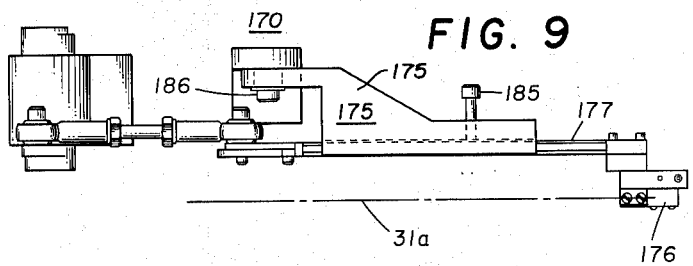
FIG. 9
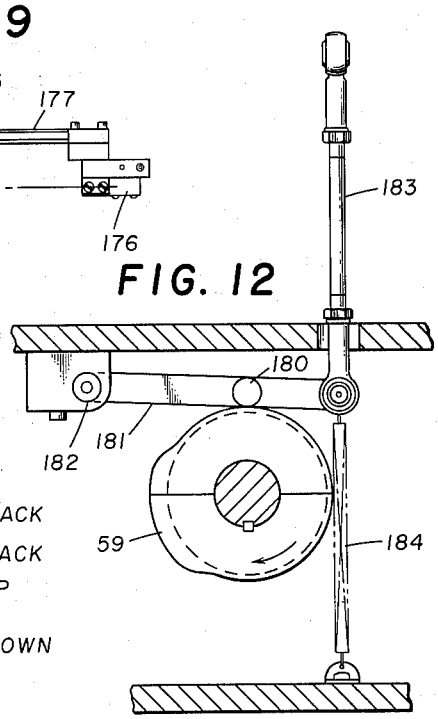
FIG. 12
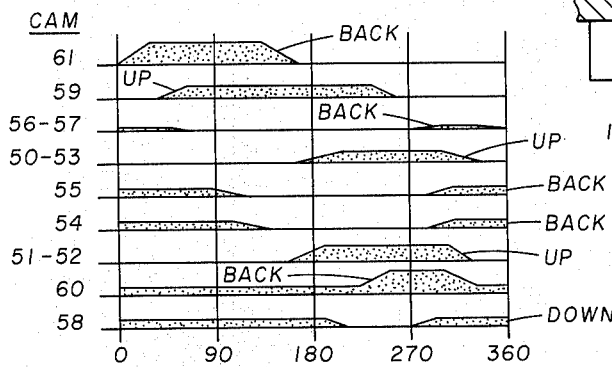
FIG. 21
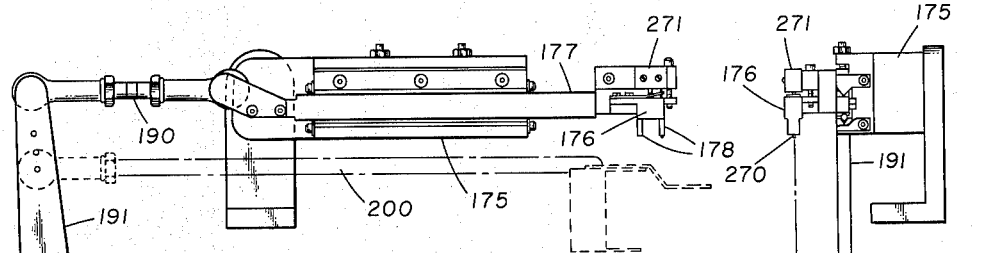
FIG. 10
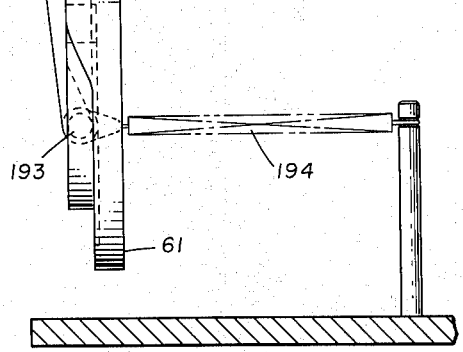
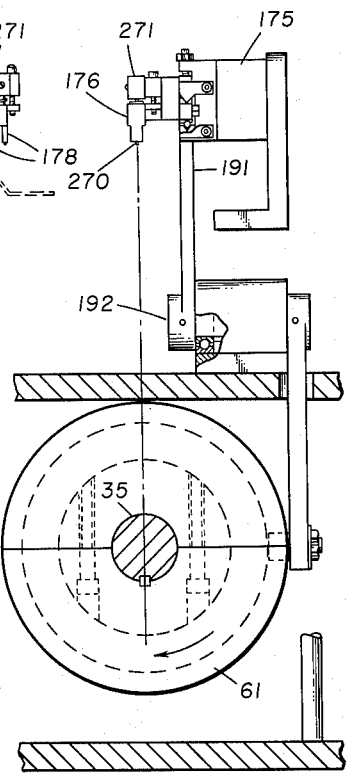
FIG. 11

United States Patent Office 3,219,068
Patented Nov. 23, 1965

3,219,068
SYSTEM FOR HANDLING ELECTRICAL COMPONENTS HAVING SLENDER COLUMNAR LEADS
Orville M. Strohl, Garland, Tex., assignor to Texas Instruments Incorporated, Dallas, Tex., a corporation of Delaware
Filed Feb. 14, 1963, Ser. No. 258,590
8 Claims. (Cl. 140—147)

This invention relates to manipulation of electrical components such as transistors having depending, slender, columnar leads and more particularly to a system for sequentially receiving oriented transistors and for straightening the leads and inserting the leads into a holder.

In transistor production, it is necessary to transfer transistors from one processing unit to another. Transistors generally have slender columnar leads extending from a header on which the transistor wafer is mounted. In various fabrication processes the leads often are bent, twisted and intermingled so that tedious and time-consuming operations may be involved in effecting a transfer from one fabricating unit to another. Devices have been provided in the art for straightening transistor leads. However, it has been found that twisted leads may be broken free from a glass or metal seal in a header or the unit otherwise may be damaged. The present invention is directed to handling of such electrical components. Each lead of each transistor is individually nested when separated from other transistors, and straightened. Lateral support is provided for facilitating insertion into units in which some resistance is encountered. Lateral support is maintained over substantial lengths of the leads as they are inserted.

In accordance with the present invention there is provided a component manipulating system wherein electrical components with a plurality of long, thin, columnar leads are presented sequentially at a loading station. There is provided a clamp for receiving and securing the component with the leads extending downward therefrom. A gathering means at the lower lead extremities is provided for grouping the leads in a confined zone. A pair of combs are threaded horizontally between and around the leads. A first comb having an upper planar surface and a leading edge beveled from a point in said surface away from the zone threads the leads immediately adjacent the component. A second comb is provided with blades positioned for registration with the slots in the first comb for capture of one lead in each slot in the first comb to straighten the leads. Means are provided for moving both combs simultaneously downward along the leads to straighten portions thereof extending below said combs. Means are then provided for transferring the component from said zone with the leads straightened.

In a further aspect of the invention, transfer means are provided which include a carrier strip with apertures therethrough aligned vertically below the points of emergence of the leads from the component. Combs move downward to straighten the leads and move the lower ends of the leads into alignment with the holes in the carrier. Simultaneously therewith the clamp moves downwardly to drive the leads through the comb and into the carrier, following which the combs and the clamp are retracted and elevated for a subsequent cycle.

Figure 2:
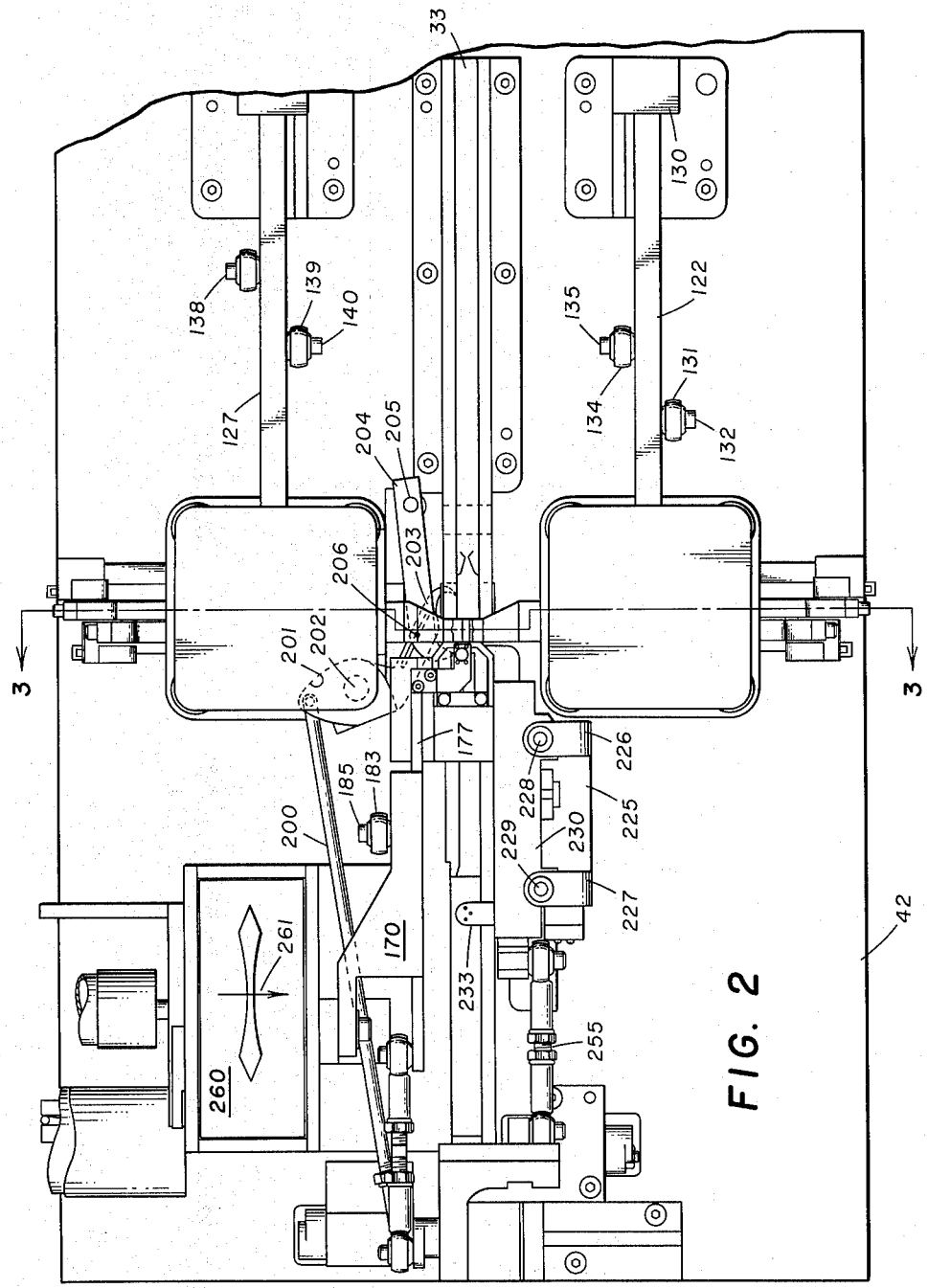
Figure 3:
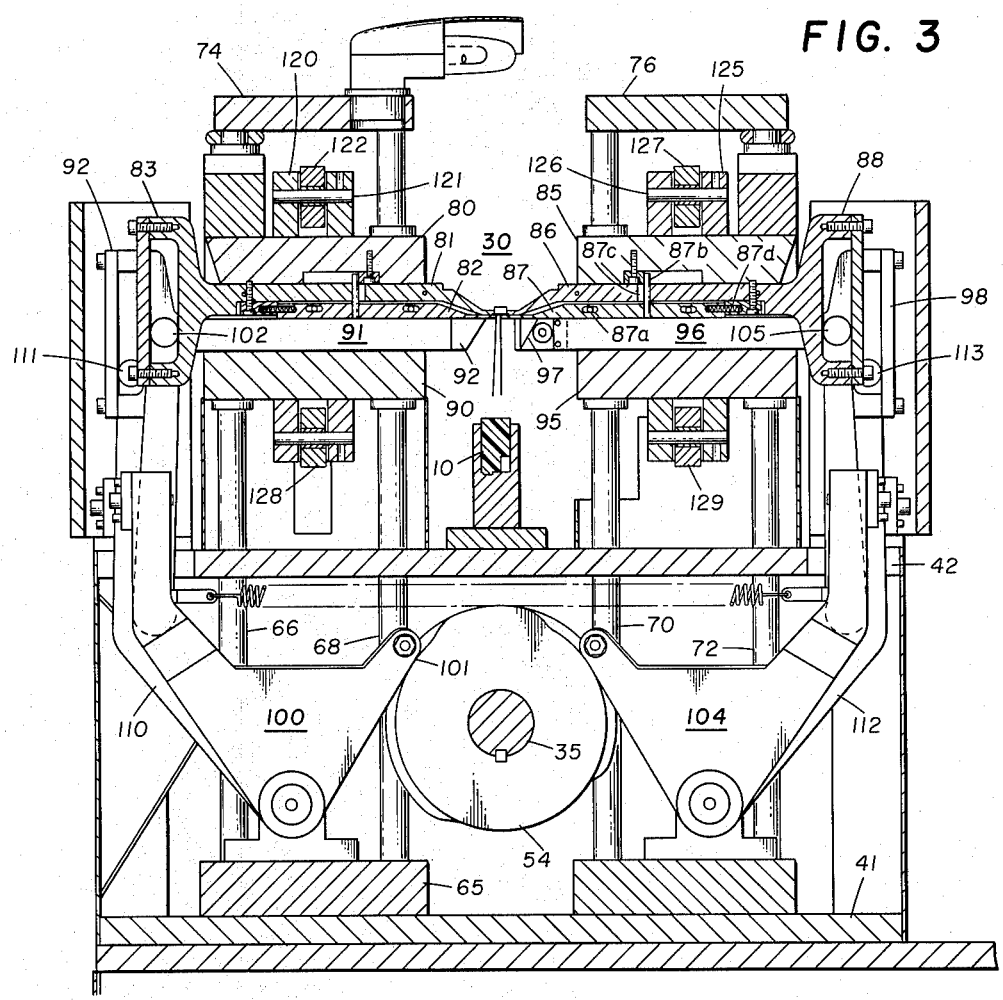
Figure 4:
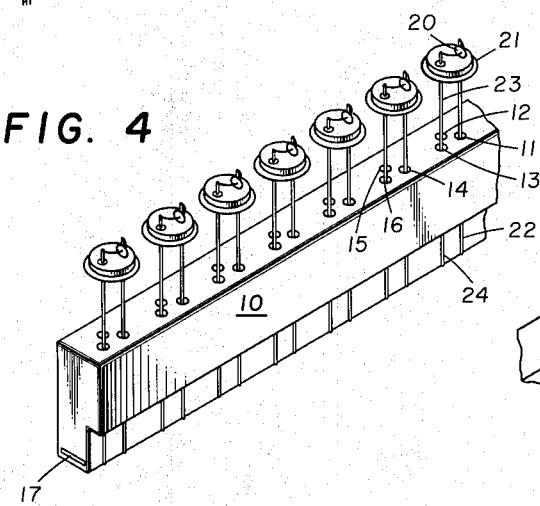
Figure 5:
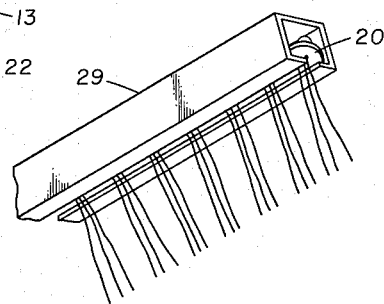
Figure 13:
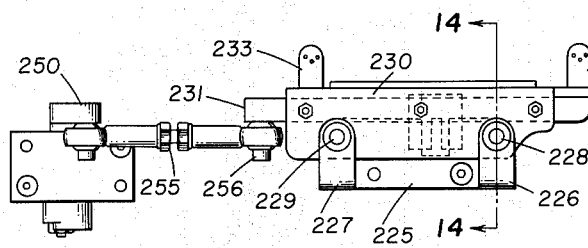
Figure 15:
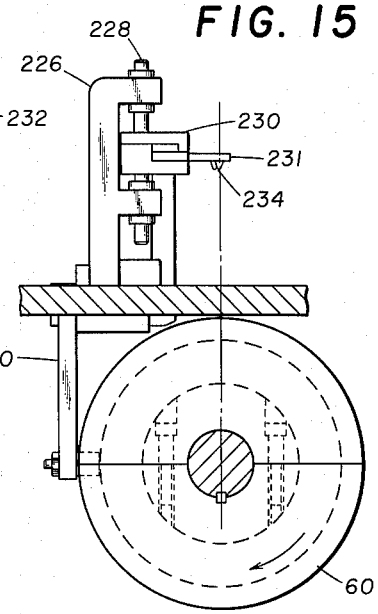
Figure 14:
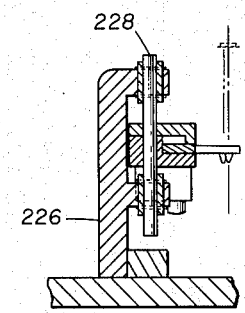
Figure 17:
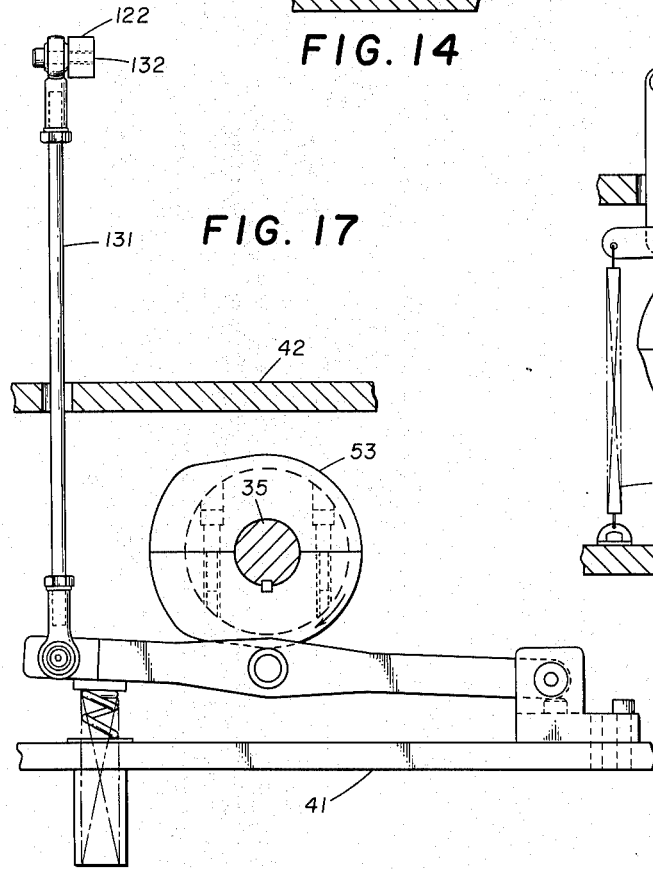
Figure 16:
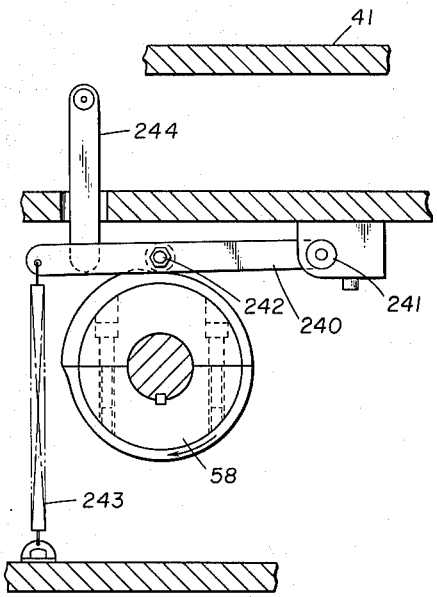

For a more complete understanding of the present invention and for further objects and advantages thereof, reference may now be had to the following description taken in conjunction with the accompanying drawings in which:

FIGURE 1 is a side view of a carrier strip loader of the present invention;
FIGURE 2 is a top view of the system of FIGURE 1;
FIGURE 3 is a sectional view taken along the line 3—3 of FIGURE 2;
FIGURE 4 is an enlarged isometric view of the carrier strip of FIGURE 3 into which the transistors are to be loaded;
FIGURE 5 is an isometric view of a transistor slide pack;
FIGURE 6 is an enlarged top view of the transistor track adjacent the loading station;
FIGURE 7 is a side view of the track of FIGURE 6;
FIGURE 8 is an end view as taken along the line 8—8 of FIGURE 6;
FIGURE 9 is a top view of the loader head and its control mechanism;
FIGURE 10 is a side view of the loader head mechanism of FIGURE 9;
FIGURE 11 is a front view of the loader head mechanism;
FIGURE 12 is a front sectional view showing the vertical movement for the loader head linkage of FIGURES 9-11;
FIGURE 13 is a top view of the carrier strip index mechanism;
FIGURE 14 is a sectional view taken along the line 14—14 of FIGURE 13;
FIGURE 15 is a front view of the carrier strip indexing assembly of FIGURE 13;
FIGURE 16 is a sectional view illustrating the vertical linkage for the carrier strip index assembly of FIGURES 12-14;
FIGURE 17 is a front sectional view showing the cam linkage for vertical movement of the clamp;
FIGURE 18 is a top view of the end of the female comb;
FIGURE 19 is a sectional view taken along line 19—19 of FIGURE 18;
FIGURE 20 is a perspective view of the end of the male comb; and
FIGURE 21 is a time sequence chart.

*General description*

The present invention will be described in connection with one embodiment which has for its purpose the loading of transistors in a carrier strip, such as strip 10 shown in FIGURE 4. As viewed in FIGURE 4, the carrier strip is provided with spaced apart sets of holes. Holes 11, 12 and 13 comprise a first set and holes 14, 15 and 16 comprise a second set. Transistors having three slender column-like leads depending from a header are to be loaded in a strip carrier. Transistor wafer 20 is mounted on a header 21 having three leads 22, 23 and 24. The leads 22, 23 and 24 are to be inserted in holes 11, 12 and 13, respectively. When components of this type have bent leads, handling becomes a problem. Generally they must be straightened before they can be inserted into the carrier strip 10. The carrier strip 10 includes a rubber strip 17 which is penetrated by holes 12 and 15. When the lead 23 passes through the rubber strip which locks it in the carrier, compressive forces on the slender column-like lead 23 may cause it to bend.

Thus, the embodiment of the invention herein described provides for initial straightening of the leads and the insertion of the leads into the holes in the carrier strip 10 while eliminating the slender column effect thereof.

*Frame and main drive*

Referring to FIGURES 1-3, transistors are presented to the unit in a slide pack 29. They are fed to a loading station 30, FIGURE 3, by way of a curvilinear track 31, FIGURE 1. The inclined slide pack 29 is loaded as shown in FIGURE 5. It is locked onto the track 31 at point 32.

The transistors are to be loaded into the carrier strip 10, FIGURE 4, which is moved stepwise past the loading station 30 in a horizontal track 33, FIGURE 2.

The system for receiving, straightening and loading the transistors into the strip 10 includes a plurality of cams mounted on a shaft 35. The shaft 35 has a drive pulley 36 to which a motor 37 is belted as indicated by the dotted linkage 38. The shaft 35 is supported by bearing blocks 39 and 40 which in turn are supported by a base plate 41. A second plate 42 is supported by columns 43 and 44 so that it is parallel to but spaced above the bottom plate 41.

Cams 50–61 are mounted on shaft 35 at succeedingly greater distances from the drive pulley 36 with face cams 60 and 61 being mounted at the end of shaft 35 opposite the drive pulley 36.

Eight posts are supported from base blocks 65 and extend upwardly to form guides for a plurality of carriers which are employed in performing the clamping, straightening and loading functions at the loading station 30. Two front posts 66 and 67 are shown in FIGURE 1. Front posts 66 and 68 and rear posts 70 and 72 are seen in FIGURE 3. Crown block 74 is mounted on the top of the front four posts, including posts 66–68. A crown block 76 is mounted on the rear four posts. Four carriers travel along the posts 66–72.

As best seen in FIGURE 3, a clamp elevator carrier 80 is mounted on the front posts 66–68. The clamp carrier 80 supports a pair of horizontally slidable clamp blades 81 and 82. The lower blade 82 is a rigid, thin plate which supports each transistor header beneath the flange. The upper blade 81 has a forward tip which engages each transistor header 21 above the header flange. The upper blade 81 includes a yoke 83 at the end thereof opposite the loading station 30. The lower blade 82 is carried by the upper blade and moves therewith.

A second clamp carrier 85 is mounted on the rear posts and includes clamp elements 86 and 87, the element 86 including a yoke 88.

A third carrier 90 is mounted on the front posts and supports a horizontally movable female comb 91 having a beveled tip 92 shown in detail in FIGURES 18 and 19. The upper surface 91a of the comb is planar and is in contact with the lower surface of the clamp element 82. Three slots 91b, 91c and 91d are formed by comb 91. The ends of the slots 91b–91d are perpendicular to the upper surface 91a. The slots 91b–91d are beveled at the tip 92 and are of width slightly greater than the lead diameter. The comb 91 includes a yoke 92, FIGURE 1, at the end thereof opposite tip 92. A fourth carrier 95 is mounted on the rear posts 70 and 72 and includes a male comb element 96 shown in FIGURE 20. Comb 96 has a plurality of blades 96a–96c at the lead edge thereof and slopes upwardly from tip 97 to match the bevel on the comb 91. The tip 97 is flat in the plane of the lead edges of blades 96a and 96c. The lead edge of blade 96b is in front of blades 96a and 96c in accordance with the spacing of leads 22–24, FIGURE 4. The blades 96a–96c are secured in comb 96 by pins 96d and 96e and screw 96f. The comb 96 includes a second yoke 98 at the end opposite tip 97.

The yoke 83 is actuated to move the clamp elements 81 and 82 toward and away from the loading station 30 by a lever 100 which is actuated by cam 54 having a cam follower 101. The lever 100 supports a pin 102 at the upper extremity thereof which registers in the yoke 83. Thus, as the cam 54 rotates on shaft 35, the clamp elements 81 and 82 are moved horizontally while the presence of the yoke structure permits them to be moved vertically with the block 80. Similarly, a lever 104 is provided which is driven by cam 55 (not illustrated in FIGURE 3) and which drives the elements 86 and 87 by means of a pin 105 which works in the yoke 88.

The female comb 91 is moved horizontally under the control of a lever arm 110. Arm 110 is controlled by cam 56 and carries a pin 111 at the upper end thereof for co-action with the yoke 92. Similarly, the male comb 96 is moved horizontally under the control of a lever arm 112 driven by cam 57 and which carries a pin 113 in the upper end thereof coupled to yoke 98.

The upper carrier 80 is provided with a shaft mounting block 120 which supports a shaft 121. The shaft 121 works in an end slot in a lever arm 122 for elevating and lowering the carrier 80. Similarly, the carrier 85 is provided with a shaft mounting block 125 which in turn supports a shaft 126 which is linked to a lever arm 127 to raise and lower the carrier 85. In a similar manner lever arms 128 and 129 are linked to the carriers 90 and 95 to raise and lower them.

As best seen in FIGURE 1, the lever arm 122 is pivoted at point 130 and is actuated by a push rod 131 which is linked to the arm 122 at a pivot 132. The arm 128 is pivoted at point 133 and is linked to a push rod 134 at pivot 135. Push rods are also provided for the levers 127 and 129. The push rod 137 is coupled to the arm 127 at pivot 138. A push rod 239, shown only at its upper end in FIGURE 2, is coupled to arm 129 at pivot 140. The pivot 135 of FIGURE 1 is aligned with pivot 140 of FIGURE 2. The rods 131, 134, 137 and 139 extend upward through slots in the plate 42 and are actuated by cams 53, 52, 50 and 51, respectively.

The drive linkages for push rods 131, 134, 137 and 139 are generally as shown in FIGURE 17 where rod 131 is shown with its drive connections to cam 53.

Transistor feed and index

Transistors in the slide pack 29 (FIGURE 1) are fed by gravity to the curvilinear track 31. Track 31 is shown in the enlarged views of FIGURES 6–8 and is formed by two parallel curved elements 150 and 151. The elements 150 and 151 are supported from the plate 42 by a bracket 152. The elements 150 and 151 are spaced apart. The lower confronting edges of the elements 150 and 151 are beveled, as best seen in FIGURE 8. A shallow rectangular groove 153 extends the length of the element 150. A rectangular groove 154 extends along the lower edge of the element 151. A lip 155 is an extension of the lower wall of groove 154. The header flange for each transistor slides in the grooves 153 and 154. Since the lip 155 is extended toward member 150 each transistor will be oriented with the leads 22 and 24 adjacent to the edge of the lip 155 and the lead 23 adjacent the edge of the member 150.

At the end of the track 31 adjacent to the loading station there is provided a pair of tongs 156 and 157. The latter tongs are mounted on pivots 158 and 159 on members 150 and 151 respectively. Tongs 156 and 157 include adjustable stop screws 160 and 161 which may be set to determine the proximity with which the tips are permitted to approach each other. A spring 162 is connected between the tongs 156 and 157 to urge them toward each other and normally to maintain stop screws against the central stop element 163.

As best seen in FIGURE 8, a pair of pins 164 and 165 extend downwardly from the tips of the tongues 156 and 157, respectively. They serve as a detent or stop for the transistor headers as they move along the track formed by elements 150 and 151. In addition to the gravitational force on the transistors in the track portion shown in FIGURES 6–8, compressed air is directed from a plurality of ports (not shown) inwardly from both sides of the grooves 153 and 154, as indicated by arrows 166, to maintain transistor headers stacked one against the other with the lead transistor header against pins 164 and 165. By this means, a transistor header is always maintained in position adjacent to the loading station and resiliently restrained by spring 162.

Loader head control

With transistors adjacent to the loading station 30 a loading head (omitted from FIGURE 2) is mounted for movement under control of a slide-elevator unit 170, FIGURES 9–11, and serves to engage each header and move it forward into the header clamp 81–82, 86–87 of FIGURE 3. A loader head 176 is supported at the end of a slidable bar 177 mounted for slide movement within the element 175. The element 175 is mounted parallel to and back of the track 31, the center of which is indicated by line 31a, FIGURE 9. The head 176 is supported with a pair of short pins 178 depending therefrom at the center of the transistor track. At a zero position, the pins 178 are at rest immediately above the transistor held at rest by pins 164 and 165 (FIGURE 8). The head 176 is lowered until the bottoms of pins 178 engage the rim of each header. The head is then moved forward (to the right as viewed in FIGURES 9 and 10) to slide the transistor past pins 164 and 165 and onto a track extension effectively formed by bottom clamp blades 82 and 87. After the header is clamped by blades 81–82, 86–87, the head 176 is retracted and returns to its zero position pending the initiation of a second cycle.

The mechanism for effecting the foregoing movements is shown in FIGURES 1 and 9–12. Cam 59 controls the elevation of the loader head. As best shown in FIGURE 12, a cam follower 180 is mounted on a lever arm 181 pivoted at point 182 and linked to a push rod 183. A spring 184 maintains the follower 180 in contact with the surface of the cam 59. The upper end of the push rod 183 is coupled to pivot 185 on the arm 175. Arm 175 is mounted for rotation about the pivot 186.

As best shown in FIGURE 10, the slide bar 177 is supported for translation in the arm 175 in a ball-bearing slideway. The end of the bar 177 opposite the head 176 is secured to a push rod 190 which, in turn, is coupled to the upper end of a lever 191. The lever 191 is mounted on a pivot 192 and has a cam follower 193 at the lower end thereof. The cam follower 193 is urged by spring 194 into contact with the cam surface of the face cam 61. By this means, the head 176 is translated over a limited traverse between the position of transistors at the stops 164 and 165 and the loading station 30.

As previously explained, as the head 176 moves each transistor to the loading station 30 where it is clamped and the lower ends of the leads are captured or bunched by action of scissors which engage the leads near the lower ends thereof. The scissors are best seen in FIGURE 2. A push rod 200 is coupled to the lever 191 below push rod 190. The other end of the push rod 200 is coupled to a scissor handle or lever plate 201 (shown dotted) which is mounted for rotation about pivot 202. A scissor blade 203 having a curved tip is formed by an extension of the plate 201. Thus, as the head 177 moves forward, the tip of the scissor blade 203 is rotated clockwise as to encompass a limited zone at the loading station. The blade 203 is coupled to a second cooperating scissor blade 204 which is mounted for rotation at pivot 205. The blade 203 has a longitudinal slot therein. The blade 204 has a pin at point 206 which rides in the slot in blade 203 to cause blade 204 to approach blade 203, thereby gathering the transistor leads between them at the loading station. Blade 204 has an upturned flange tip extending forward therefrom. The tip serves to slice through or between the leads of the transistor moved to station 30 and the transistor at the end of track 31. As the head 177 of FIGURES 9 and 10 is retracted, the blades 203 and 204 likewise are retracted.

*Carrier strip indexing*

FIGURES 1, 2 and 13–16 illustrate the mechanism for moving the carrier strip 10 (FIGURE 4) stepwise through the operating station sequentially to receive transistors therein. A bracket 225 is fastened to the plate 42 (FIGURE 1). The bracket includes a pair of upstanding columns 226 and 227. The columns support a pair of guide rods 228 and 229, best seen in FIGURES 13–15. An indexing head carrier 230 is mounted for vertical slide movement on the rods 228 and 229. An indexing head 231 is mounted for horizontal slide movement in the carrier 230. Head 231 includes a pair of arms 232 and 233. Three cone-shaped prongs extend downward from the end of each of the arms 232 and 233. The cone-shaped prongs 234 are best seen in FIGURES 14 and 15. Prongs 234 are spaced one from another in accordance with the spacings between holes in the carrier strip 10 (FIGURE 4). The arms 232 and 233 are spaced one from another a distance equal to a multiple of the spacings between the sets of holes in the carrier strip 10. The spacing between them corresponds with the spacing between the lead set and trailing set of holes in each carrier strip. By this means one set of holes in each of two carrier strips will always be engaged by two sets of prongs in the indexing head 231. As illustrated in FIGURE 16, the indexing head carrier 230 is reciprocated vertically by the cam 58 which actuates a lever arm 240 which is mounted for rotation at pivot 241. A cam follower mounted on arm 240 at pivot 242 engages the surface of cam 58. A spring 243 maintains the cam follower in contact with the cam 58. A push rod 244 extends upward from near the end of lever 240 and is coupled to the brackets 245 on the indexing head carrier 230. The brackets 245 are shown in FIGURE 1. The vertical movement of the indexing head 231 is of magnitude such as to fully insert and completely clear the prongs 234 from each of the sets of holes in the carrier strip 10.

With the prongs 234 registered in the holes in each carrier strip, the strip is advanced by the action of the face cam 60 (FIGURE 1). A crank arm 250 is mounted for rotation about pivot 251. The lower end of the crank arm 250 includes a cam follower which engages the face of the cam 60. A spring 252 is anchored at a post 253 and is coupled to the lower end of the arm 250 to maintain contact between the cam follower and the face of the cam 60. The upper end of the crank arm 250 is connected by a push rod 255 to the end of the indexing head 231 at the pivot 256. Cams 58 and 60 are positionally synchronized on shaft 35 to move the prongs 234 in a trajectory which will advance the carrier strips stepwise through the operating station 30. A supply of carrier strips is maintained in a magazine 260 (FIGURE 2). They are moved in the direction of arrow 261 under spring-loading pressure when the trailing end of one carrier strip reaches the lead end of the carrier strips stored in the magazine 260.

*Time sequence*

The operation time sequence as controlled by cams on shaft 35 is illustrated by the cam chart of FIGURE 21. The chart indicates displacements relative to the zero transistor position of the various elements. In the present embodiment of the invention, ten sets of holes are provided in carrier strips five and one-half inches in length. The cam 61 provides horizontal indexing for each transistor moving each transistor presented at the end of the track 31 one-half inch to the station 30 directly above a set of holes in a carrier strip. The cam 59 controls the vertical movement of the loading head 176. The cams 56 and 57 control the horizontal movement of the clamps 81–82, 86–87. The cams 50 and 53 control the vertical movement of the clamps 81–82, 86–87. The cam 55 controls the horizontal movement of the female comb 91. Cam 54 controls the horizontal movement of the male comb 96. Cams 51 and 52 control the vertical movement of combs 91 and 96. Cam 60 controls the horizontal movement of the strip index head 231. The cam 58 controls the vertical movement of the strip index head 231.

The transistors are oriented as delivered to the end of track 31 with two leads adjacent to the edge of track element 151 and one lead adjacent to the track element 150. Each transistor is moved by head 176 onto the extension of track 31 formed by clamp blades 82 and 87. As presented at the operating station the leads are straightened. In a zero state clamp blades 82 and 87 are aligned with the track 31. A carrier strip 10 is indexed immediately below the operating station to receive each of three transistor leads in a set of holes extending therethrough.

In the first operation, a loader head 176 engages the header of the transistor to move it from track 31 and onto the vertical support provided by clamp blades 82 and 87. This places the transistor in loading position.

As the transistor is moved by the loader head 176 onto the header clamp, scissor elements 203, 204 encompass the leads of the transistor near the lower extremities gathering and loosely confining them.

Upper clamp elements 81 and 86 then move horizontally from opposite sides of the header to engage the header.

The loader head 176 is retracted to its zero position at the end of track 31 where it remains at rest until the beginning of the next succeeding cycle.

As the head 176 is being retracted, a female comb 91 moves from the front to thread its teeth between adjacent transistor leads. The pointed tip 92 assists in bringing the leads into the vertical slots 91b–91d.

After the female comb 91 is moved to initiate capture of each lead in a comb slot, the male comb 96 is then moved forward. Blade 96b progressively entering slot 91c is followed by entry of blades 96a and 96c into slots 91d and 91b, respectively. The blades 96a–96c force the transistor leads back against the ends of the slots. The size of the slots in comb 91 and the extent of entry of the blades 96a–96c is such that each transistor lead is confined in a vertical tubular aperture, which is slightly larger than the leads. The combs 91 and 96 then move vertically along the leads to straighten the lower portions thereof until the bottoms thereof rest on the top of the carrier strip 10. However, when the bottoms of the combs reach the lower tip of the leads, having thus straightened the leads by combing downward over them, the clamps 81–82, 86–87 begin a downward traverse in synchronism with the further downward movement of the combs 91 and 96. When the combs come to rest on the top of the carrier strip, the lower ends of the transistor leads are in axial alignment with a set of carrier strip holes. The clamp continues downward movement inserting the leads through the apertures in the combs and into the holes in the carrier strip 10. When the lower end of a lead enters the rubber strip 17, the clamp is closely adjacent the upper surface of the comb so that the transistor leads are unsupported laterally only over the distance the lead is inserted into the rubber strip 17. Thus there is avoided the damage to the transistor leads by reason of the slender column effect. The transistor lead is supported either by the walls of the holes in the carrier strip or the walls of the apertures in the combs except for the spacing remaining between the upper surface of the combs and the lower surface of the header clamp at the instant that the transistor lead encounters resistance.

With the transistor leads fully inserted into the carrier strip 10, the combs 91 and 96 and the clamps 81–82, 86–87 are retracted and then elevated back to their zero position.

The carrier strip 10 is then indexed as to bring into registration with the operating station 30 the next set of holes.

In operation, an overriding control is provided and includes a sensing finger 270 (FIGURES 1, 10 and 11) extending downwardly through the tubular front pin 178 in the loading head 176. The finger 270 serves to actuate a microswitch 271 mounted on the head 176 to de-energize the driving motor 37 and to latch the same in a de-energized state when the loading head 176 is lowered to engage a transistor header and fails to identify the presence of a header at the end of the track 31. The downward traverse of the loading head 176 is controlled so that presence of a header is required for the continued operation of the system.

As illustrated in FIGURE 1, the motor 37 is energized by way of a control unit 37a. The microswitch 271 is shown in a supervisory control circuit and is controlled by two switches. The motor control unit 37a requires, for continuous operation, that the control circuit 300 be maintained closed. Microswitch 271 is a normally open switch which is closed when the loading head 176 is lowered and the finger 270 encounters a transistor header. The circuit 300 is also closed on a time-share basis by a microswitch 301 which engages the face of the cam 60. Switch 301 is synchronized with the lowering of the loader head 176. Switch 301 is opened by action of cam 60 shortly after switch 271 is to be closed. Switch 301 is closed just before the loader head 176 lifts the finger 270 off from a header. By this means the circuit 300 remains closed as long as the supply of transistors is maintained at the end of the track 31. Other sensing means may be provided such as employ photocells or the like. Control of switches 271 and 301 has been shown as being representative of a supply sensing means.

While the invention has been described in connection with the straightening and insertion of transistor leads in a carrier strip, it is to be understood that the invention is applicable to manipulation of electrical components in structures other than transistors where a plurality of leads are to be straightened and/or loaded into a handling unit.

In the embodiment of the invention illustrated herein, transistors having three leads extending therefrom were received, the leads straightened and inserted into carrier strips at the rate of up to 5000 transistors per hour. It may be desirable to merely drop the transistors, with the leads straightened, onto a conveyer means rather than insert the leads into a carrier strip. However, the complete operation as above described may be carried out at the above rate with optimum control over each component.

From the foregoing it will be seen that the invention provides for handling electrical components having a body such as a transistor header or the like with leads extending therefrom. A supply track extends to an operating station for sequentially delivering to the end of the track the components oriented with the leads spaced apart in the direction of movement of the components along the track. A clamp is provided having a pair of plates which are movable in direction perpendicular to the track and into a confronting edge relationship to form an extension of the track. A loader head operable above the end of the track engages each component body at the end of the track to move it onto the plates. The clamp engages each of the body portions to hold the component in fixed position on the plates. A first comb structure is then moved parallel to the movement of the plates into the station from a first direction separately to capture the leads between teeth which preferably are planar or of other configuration corresponding with the configuration of the body at the points of emergence of the leads. Preferably, the comb has bevelled leading edges to facilitate penetration and separation of the leads. A second comb is movable toward the end of the first comb from the opposite direction and has blades positioned for registration in each slot in the first comb. The blades force one lead into each of the slots and move the same to the ends of the slots to straighten the leads. A carrier track is positioned below the operating station for movement of carrier means through the operating station. The carrier is positioned on the side of the combs opposite the plates. A cam-driven system is then provided for moving the combs toward the carrier track and for moving the clamp at least in part with the movement of the combs toward the carrier track. Means are then provided for retracting the combs and the clamp upon deposit of each transistor with predetermined orientation of the straightened leads at the carrier track and preferably in a perforated carrier strip positioned in the carrier track.

The system, in operation, accepts electrical components having thin, columnar leads rooted in the body which may be bent. The body is first clamped in a fixed position with the leads spaced apart along a frst direction. Moving forces are then applied to the leads beginning at points immediately adjacent the roots of the leads and at progressively increasing distances from the roots to force at least the root portions thereof into separate planes perpendicular to the aforementioned direction. Moving forces are then applied to each lead at distances from the roots which progressively decrease to bring said trunk sections of the leads into linear configurations with one lead in each of the separate planes. Preferably, the trunk sections are then parallel and a force is then applied progressively along the length of the leads opposite the roots to conform the entire length of the lead to the linear configuration. Thereafter, the body is released with the leads straightened.

Throughout the operation the clamps 81–82, 86–87 maintain the body or header in a fixed position. As best seen in FIGURE 3, the blades 82 and 87 are slidably mounted in grooves or ways in the bottom of the clamp members 81 and 86, respectively. The blade 87, for example, is supported by a pin 87a near the front end thereof. A second pin 87b is fixed in the blade 87 and operates in a slot 87c. A spring 87d urges the blade 87 forward so that the tip of blade 87 precedes the clamp member 86. When the pin 87b engages the stop in the carrier 85, the lower blade 87 is arrested in its forward movement. However, the upper member 86 may continue its forward movement under cam control to engage the header assembly after it has been loaded onto the blades 82 and 87. The clamp element 82 is similarly mounted in the clamp element 81 so that the blades 82 and 87 will be moved into the operating zone ahead of clamp elements 81 and 86 to form an extension of the track 31, FIGURE 1. It will be appreciated that other specific configurations and instrumentalities may be employed for carrying out the operations above described.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a system having means at an operating station for sequentially receiving oriented components with a plurality of long thin leads extending therefrom to load them individually into a perforated carrier, the combination which comprises:
    (a) a clamp for engaging each component with said leads extending therefrom,
    (b) means for confining said leads in a limited zone near the ends of said leads opposite said component,
    (c) a first comb movable into said station having a plurality of teeth whose surface adjacent said component conforms with the surface of said component from which said leads emerge and whose leading edges are beveled to points at said surface for threading said leads between said teeth,
    (d) a second comb having a blade positioned for registration with each slot in said first comb and having structure supporting the blades beveled away from said surface and toward said first comb for forcing one lead into each slot to straighten each lead,
    (e) means for indexing one said carrier with perforations therein aligned with points of emergence of said leads from said component,
    (f) means for moving the combs toward said carrier,
    (g) means for moving said clamp toward said carrier to insert said leads into the aligned perforations, and
    (h) means to retract said clamp and said combs.

2. In a system having means at an operating station for sequentially receiving oriented transistors having a plurality of long thin leads extending from a bottom header plate to load them individually into a perforated carrier, the combination which comprises:
    (a) a clamp for grasping each header plate,
    (b) means for confining said leads in a limited zone near the ends of said leads opposite said header plate,
    (c) a first comb movable into said station having a plurality of teeth whose surface adjacent said plate is planar and whose leading edges are beveled to points at said surface for threading said leads between said teeth,
    (d) a second comb having a blade positioned for registration with each slot in said first comb and having structure supporting the blades beveled away from said surface and toward said first comb for forcing one lead into each said slot to straighten each lead,
    (e) means for indexing one said carrier with perforations aligned with points of emergence of said leads from said header plate.
    (f) means for moving the combs in direction leading away from said header plate and toward said carrier,
    (g) means for moving said clamp toward said carrier to insert said leads into the aligned perforations, and
    (h) means to retract said clamp and said combs.

3. A handling system for loading transistors into a carrier strip comprising:
    (a) a guide track leading to an operating station for sequentially delivering to the end of said track transistors oriented with leads spaced apart in the direction of movement in said track,
    (b) a clamp having a pair of plates movable perpendicular to said direction at the end of said track to form an extension thereof,
    (c) a loader head for engaging each transistor header at the end of said track and to move it onto said plates,
    (d) means in said clamp for holding each said header in fixed position on said plates,
    (e) a first comb adapted to move parallel to movement of said plates into said station with teeth spaced to penetrate between and around said leads,
    (f) a second comb movable parallel to the direction of movement of said plates and toward said first comb having blades positioned for registration with each slot in said first comb to force one of said leads into each said slot,
    (g) a carrier track positioned for movement of a carrier through said operating station on the side of the combs opposite said plates, and
    (h) means for retracting said combs and said clamp for deposit of each transistor with predetermined orientation of straightened leads at said carrier track into said carrier strip.

4. A handling system for loading transistors into a carrier strip comprising:
    (a) a guide track leading to an operating station for sequentially delivering to the end of said track transistors oriented with leads spaced apart in the direction of movement in said track,
    (b) a clamp having a pair of plates movable perpendicular to said direction at the end of said track to form an extension thereof,
    (c) a loader head for engaging each transistor header at the end of said track and to move it onto said plates,
    (d) means in said clamp for holding each said header in fixed position on said plates,
    (e) a first comb adapted to move parallel to movement of said plates into said station with teeth spaced to penetrate between and around said leads, (f) a second comb movable parallel to the direction of movement of said plates and toward said first comb having blades positioned for registration with each slot in said first comb to force one of said leads into each said slot, (g) a carrier track positioned for movement of a carrier through said operating station on the side of the combs opposite said plates, (h) means for moving said combs toward said carrier track, (i) means for moving said clamp toward said carrier track at least in part in synchronism with movement of said combs, and (j) means for retracting said combs and said clamp for deposit of each transistor with predetermined orientation of straightened leads at said carrier track into said carrier strip.

5. A handling system for loading transistors into a carrier strip comprising:

(a) a supply track leading to an operating station for sequentially delivering to the end of said track transistors oriented with leads spaced apart in the direction of movement in said track, (b) a clamp having a pair of plates movable perpendicular to said track into confronting edge relationship to form an extension of said track, (c) a loader head for engaging each transistor header at the end of said track and to move it onto said plates, (d) means in said clamp for holding each said header in fixed position on said plates, (e) a first comb adapted to move parallel to movement of said plates into said station with teeth spaced to penetrate between and around said leads, said teeth being planar adjacent to the face of said plates opposite said transistor header and having leading edges beveled to points at said face for penetration and separation of said leads, (f) a second comb movable parallel to the direction of movement of said plates and toward said first comb having blades positioned for registration with each slot in said first comb to force one of said leads into each said slot, (g) a carrier track positioned for movement of a carrier through said operating station on the side of the combs opposite said plates, (h) means for moving said combs toward said carrier track, (i) means for moving said clamp at least in part in synchronism with movement of said combs toward said carrier track, and (j) means for retracting said combs and said clamp for deposit of each transistor with predetermined orientation of straightened leads at said carrier track into said carrier strip.

6. In a system having means at an operating station for receiving oriented components having a plurality of long thin leads, the combination which comprises:

(a) clamp means for grasping each component with said leads extending therefrom, (b) a first comb movable into said station with teeth having leading edges beveled away from said component for capture of one of said leads in each slot in said comb, and (c) a second comb movable into said station from the side opposite said first comb having a blade positioned for registration in each said slot and having a support for the blades facing said first comb with a bevel complementary therewith to force one lead to the end of a slot.

7. The combination set forth in claim 6 in which each said component is moved into said station with said leads spaced one from another in direction perpendicular to the direction of movement of the combs.

8. In a system having means at an operating station for sequentially receiving components having a plurality of long thin leads, the combination which comprises:

(a) means including a clamp for orienting and grasping each component with said leads extending therefrom, (b) means for encompassing said leads near the ends thereof opposite said component, (c) a first comb driven through said operating station whose teeth have a planar surface adjacent said component and leading edges beveled to a point at said surface for capturing said leads in slots between said teeth, (d) a second comb having blades positioned for registration in said slots to force one of said leads in each of said slots to straighten them, (e) means for moving the combs simultaneously along said leads away from said component to straighten portions thereof extending beyond said combs, and (f) means for retracting said combs and said clamp to free said component after said leads are straightened.

References Cited by the Examiner

UNITED STATES PATENTS

| | | | |
|---|---|---|---|
| 3,028,886 | 4/1962 | Drukker | 140—147 |
| 3,071,166 | 1/1963 | Gutbier | 140—147 |
| 3,079,958 | 3/1963 | Helda | 140—147 |
| 3,106,945 | 10/1963 | Wright et al. | 153—32 |
| 3,122,179 | 2/1964 | Zimmerman et al. | 153—32 |

CHARLES W. LANHAM, *Primary Examiner.*